(12) United States Patent
Huber et al.

(10) Patent No.: US 10,000,246 B2
(45) Date of Patent: Jun. 19, 2018

(54) VEHICLE WITH FRONT SPOILER

(71) Applicant: Röchling Automotive SE & Co. KG, Mannheim (DE)

(72) Inventors: Ludwig Huber, Durbach (DE); Andreas Schmitt, Worms-Abenheim (DE); Peter Dill, Ingolstadt (DE)

(73) Assignee: Röchling Automotive SE & CO. KG, Mannheim (DE)

( * ) Notice: Subject to any disclaimer, the term of this patent is extended or adjusted under 35 U.S.C. 154(b) by 0 days. days.

(21) Appl. No.: 15/349,149

(22) Filed: Nov. 11, 2016

(65) Prior Publication Data

US 2017/0137073 A1    May 18, 2017

(30) Foreign Application Priority Data

Nov. 13, 2015 (DE) .................... 10 2015 222 454

(51) Int. Cl.
*B62D 35/00* (2006.01)
*B62D 37/02* (2006.01)
*B60K 11/08* (2006.01)

(52) U.S. Cl.
CPC .......... *B62D 35/005* (2013.01); *B60K 11/085* (2013.01); *B62D 37/02* (2013.01); *Y02T 10/88* (2013.01)

(58) Field of Classification Search
CPC ....... B62D 37/02; B62D 35/005; Y02T 10/88; B60K 11/08
USPC ........................................................ 296/180.1
See application file for complete search history.

(56) References Cited

U.S. PATENT DOCUMENTS

| 8,430,447 | B2* | 4/2013 | Jungert | B62D 35/005 180/903 |
| 2011/0189440 | A1* | 8/2011 | Appleby | B22C 9/04 428/156 |
| 2015/0210325 | A1* | 7/2015 | DeAngelis | B62D 35/02 296/180.1 |
| 2017/0057566 | A1* | 3/2017 | Hommes | B62D 35/00 |

* cited by examiner

*Primary Examiner* — Pinel E Romain
(74) *Attorney, Agent, or Firm* — Prince Lobel Tye, LLP

(57) ABSTRACT

A vehicle comprises a front spoiler with at least one spoiler lip made available in a front area of the vehicle and a spoiler lip drive by means of which the at least one spoiler lip may be displaced such that the aerodynamic properties of the vehicle can be changed in the front area by displacement of the at least one spoiler lip, wherein the spoiler lip drive of the at least one spoiler lip is electro-mechanical.

14 Claims, 2 Drawing Sheets

VEHICLE WITH FRONT SPOILER

CROSS REFERENCE TO RELATED APPLICATION(S)

Figure 1:
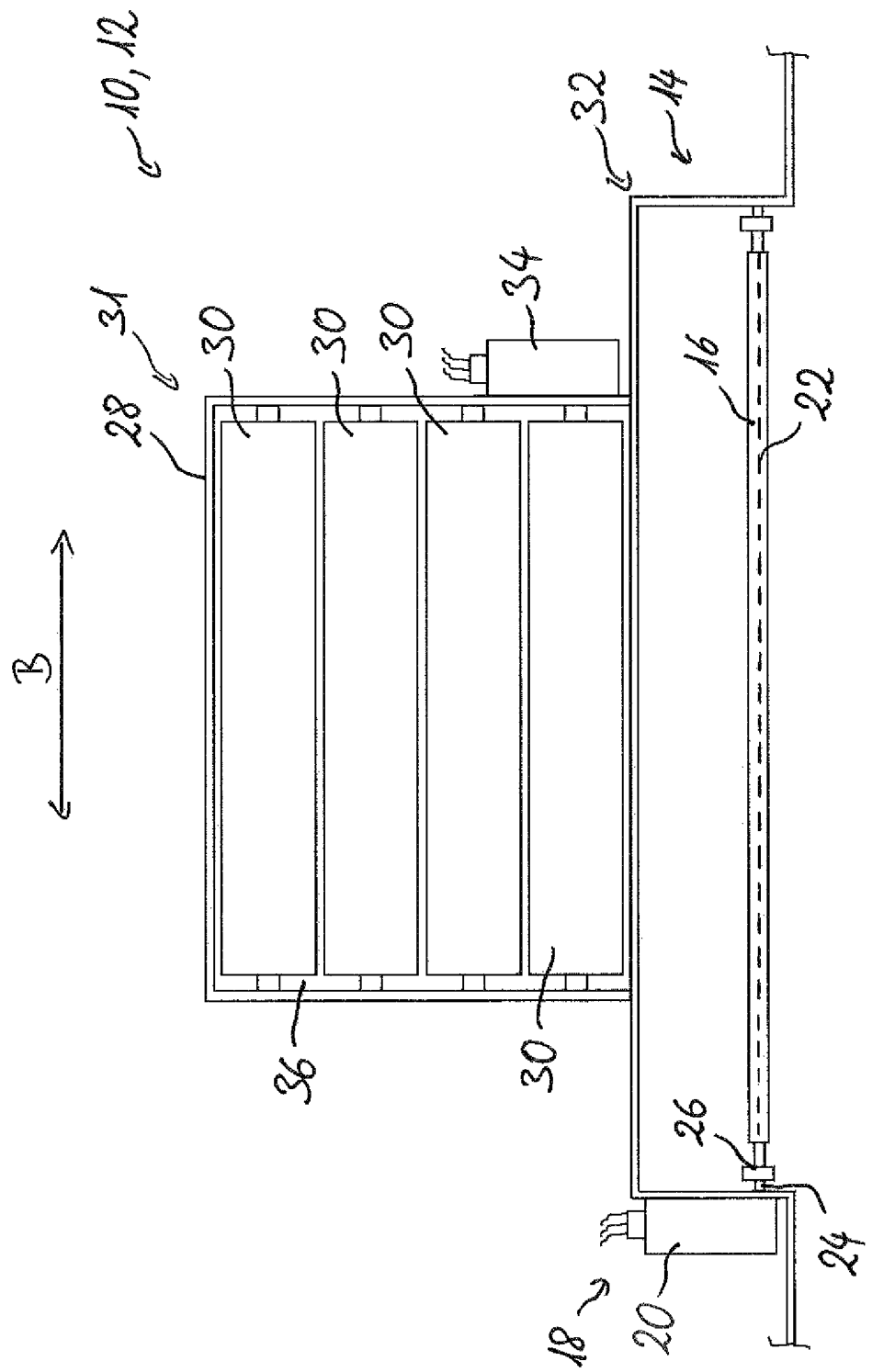

This application claims priority to German Application No. 10 2015 222 454.6, filed Nov. 13, 2015. The entirety of the disclosure of the above-referenced application is incorporated herein by reference.

BACKGROUND OF THE INVENTION

Field of the Invention

This invention relates to a vehicle comprising a front spoiler with at least one spoiler lip made available in a front area of the vehicle and a spoiler lip drive by means of which the at least one spoiler lip is adjustable such that by displacement of the at least one spoiler lip the aerodynamic properties of the vehicle are changeable in the front area.

Description of the Related Art

Such a vehicle is known, for example, from the document US 2005/0081711A1. The front spoiler disclosed in this document comprises a spoiler lip with a variety of inflatable chambers. By inflating the chambers the spoiler lip can be displaced such that the aerodynamic properties can be changed in the front area of the vehicle.

The disadvantage of the front spoiler known from the document is, on the one hand, the high weight of the pneumatic spoiler lip drive which is due to a compressor and supply lines from the compressor to the chambers. On the other hand, with such spoiler lip drives there is always the danger of undesirable leakage which adversely affects the functional capability of the spoiler lip drive. Furthermore, the compressor requires a lot of room.

SUMMARY OF THE INVENTION

It is therefore the object of this invention to make available a vehicle with a front spoiler in which known disadvantages of the prior art can be eliminated.

The object is achieved in the invention by a vehicle defined at the outset in which the spoiler lip drive of the at least one spoiler lip is of the electro-mechanical type.

In an electro-mechanical spoiler lip drive, the drive energy to displace the at least one spoiler lip is provided by an electro-mechanical actuator, like an electric motor, and is mechanically transmitted to the at least one spoiler lip. Transmission of drive energy via a fluid known from the prior art can be omitted here. Thus on the one hand weight can be saved in comparison with a front spoiler known from the prior art. On the other hand, a spoiler lip drive with higher reliability in comparison with the prior art can be made available, since with an electro-mechanical drive there is no danger of leakage. In addition, the spoiler lip drive according to the invention can be made available with a reduced size in comparison with the pneumatic spoiler lip drive because of the elimination of the compressor.

In general a front spoiler serves to reduce the lift acting on the front area of the vehicle when driving. The lift acting on the front area of the vehicle increases with vehicle speed and at higher speed, starting around 70 km/h, has a significant influence on the driving characteristics of the vehicle. Therefore at lower speeds, at less than 70 km/h, say, the spoiler lip of the front spoiler of a vehicle according to the invention can be held in a retracted position in which it has no noticeable influence on the lift acting on the front area of the vehicle, but is protected against external influences, in order to avoid damage from obstacles that might occur when driving in closed municipalities, for example, curbstone edges, or abrupt changes in the roadway incline. At higher speeds starting around 70 km/h the spoiler lip can be displaced into an extended position in which lift acting on the front area of the vehicle is reduced. As a result traction control and driving safety are increased. A reference size hereby is an identical vehicle under identical driving conditions, but in which the spoiler lip is in the retracted position or which has no spoiler lip.

Aside from the influence which a front spoiler has on the lift acting on the front area of a vehicle, in addition a front spoiler can help reduce the air drag acting on the vehicle when driving by influencing the flow control. Tests have shown that an adjustable front spoiler can result in a reduction of the air drag in contrast to a static front spoiler of larger dimensions.

In principle it should not be ruled out that the at least one spoiler lip is solely translationally displaced between a retracted and extended position. For space-saving reasons, however, it is preferable if the spoiler lip drive of the at least one spoiler lip is a swivel drive which is installed to swivel the at least one spoiler lip such that by swiveling of the at least one spoiler lip, the aerodynamic properties of the vehicle can be changed. The at least one spoiler lip can be adjustable, for example, such that the center of gravity of the spoiler lip remains unchanged as a result of a swivel movement. In order to thereby be able to influence the air drag to a greater extent in comparison, depending on the design of the front area of the vehicle it can be advantageous if the at least one spoiler lip can be swiveled such that as a result of a swivel movement its center of gravity also changes. This can thereby preferably be realized in that the at least one spoiler lip can be swiveled about an axis which does not run through the center of mass.

Preferably any rotary motor can be considered as the swivel drive, but an electromotor is preferred because of its lower weight and high flexibility in terms of attachment site.

The swivel drive can, in principle, have a direct torque transmission connection with the at least one spoiler lip. A higher flexibility in comparison with this, in terms of attachment location, can be achieved by the swivel drive having a torque transmission connection with the at least one spoiler lip and an interposed linkage and/or a gear box. Also conceivable in this regard is the use of a reduction or translating gear, in order to be able to effect a defined displacement of the at least one spoiler lip. In the process a combined swivel/rotary movement of the spoiler lip can be realized, whereby, on the one hand, there can be a specific influence on the aerodynamic properties in the front area of the vehicle and, on the other hand, the spoiler lip can be moved into a retracted position in an area of the vehicle in which the spoiler lip can be effectively protected against damage.

It can be provided in a further embodiment of the invention that at least a part of the front spoiler, preferably the at least one spoiler lip, but especially preferably the at least one spoiler lip and the spoiler lip drive, is or can be received in a front component part of the vehicle, such as a bumper and/or an engine shield and/or an air valve device housing. The front area of a vehicle according to the invention can thereby be provided with a compact and simple configuration, since already existing functional units can be used to receive the front spoiler. The configuration can be such that at least a part of the front spoiler, such as the at least one spoiler lip, is received or can be received in a front component in only one position, for example the retracted position. Thus a front component, for example, can have a recess with a shape complementing the outer shape of the at least one spoiler lip, in which the spoiler lip can be received in a retracted position. The at least one spoiler lip can thereby be effectively protected against damage in the retracted position.

Especially effective protection against damage of the front spoiler can be obtained in particular, when housings or housing sections present in the front area of the vehicle can be used to receive the entire front spoiler or at least a part of the front spoiler. The configuration can be such that the front spoiler can be received in an air valve device housing at least partially but preferably completely. This design is especially advantageous, since an air valve device housing per se is already available as a housing which is provided to receive valves extending in the vehicle width direction, so that the integration of a front spoiler extending fundamentally in the vehicle width direction is especially simple.

At least one air valve is provided in the air valve device housing which can be received on the housing and is adjustable by means of an air valve drive such that by displacement of the at least one air valve, the effective flow cross-section of a defined flow-though opening inside the air valve device housing is adjustable. If the front spoiler is received at least partially in the air valve device housing, then in principle, thought can be given to also using the air valve drive as the spoiler lip drive. In order to be able to displace the at least one spoiler lip and the at least one air valve independently of each other at any time, it is preferable if the spoiler lip drive of the at least one spoiler lip is separate from the drive of the air valve device.

In order to efficiently influence the aerodynamic properties of the vehicle, it is preferred if the at least one spoiler lip features as large an area as possible. In order not to severely limit the ground clearance because of the front spoiler, a spoiler lip can be made available with a large area such that the at least one spoiler lip extends across at least 80% of the wheel track of the front axle of the vehicle. The influence of the front spoiler on the aerodynamic properties of the vehicle can accordingly be increased if the spoiler lip extends across at least 90% or even across the entire wheel track of the front axle.

The front spoiler of a vehicle according to the invention can comprise a variety of spoiler lips which, for example, are successively positioned in the vehicle width direction and are individually adjusted by respective spoiler lip drives. Such a configuration is very complex however and quite heavy due to the plurality of drives. It is therefore preferable if the front spoiler comprises a single spoiler lip. A low weight can thereby be realized in that the spoiler lip is adjustable by a single spoiler lip drive, probably a single electromotor.

A low weight and a high mechanical stability can be guaranteed in an embodiment of the invention such that at least one spoiler lip is constructed from a thermoplastically bonded fiber structure, at least in part but preferably completely.

With this design the at least one spoiler lip is constructed at least in sections from a fiber structure which is bonded by a thermoplastic binding agent. In this regard there exist basically no restrictions with respect to the choice both of the thermoplastic binding agent as well as the fibers of the fiber structure, so long as the melting or softening point and the destruction point of the fibers are higher than the melting or softening point of the thermoplastic binding agent. The fibers can be glass, carbon, aramid or natural fibers which can be bonded with all thermoplastic synthetic materials such as PP, PE, PET, TPU or TPE. As an alternative the spoiler lip can be made from these synthetic materials without a filling.

In addition a spoiler lip formed from a thermoplastic bonded fiber structure can be constructed as a porous component part which because of its porosity can be low-weight on the one hand, and, on the other hand, also have acoustic dampening properties.

Thought can also be given to covering the spoiler lip, at least in part but preferably completely, with a protective film such as metal, which in particular prevents the penetration of water into the porous structure. In order to thereby not, or only minimally, influence the acoustic properties of the spoiler lip, the protective film can be perforated, in particular with micro-perforations. P Perforation is understood to mean that through holes or slits are provided in the protective film. In such a micro-perforation the hole diameters or the slit widths amount to less than 1 mm, preferably less than 500 µm. Both the hole diameter as well as the slit width or the hole and slit separations can be selected depending the expected acoustic frequencies, in order to be able to guarantee optimal sound passage.

BRIEF DESCRIPTION OF THE DRAWING FIGURES

This invention will be explained more closely in the following with reference to the attached figures. Shown are:

FIG. 1: A schematic depiction of a front area of a vehicle according to the invention with a spoiler lip in a retracted position, and FIG. 2: A schematic depiction of the front area shown in FIG. 1 with the spoiler lip in an extended position.

DETAILED DESCRIPTION OF THE PREFERRED EMBODIMENTS

Figure 2:
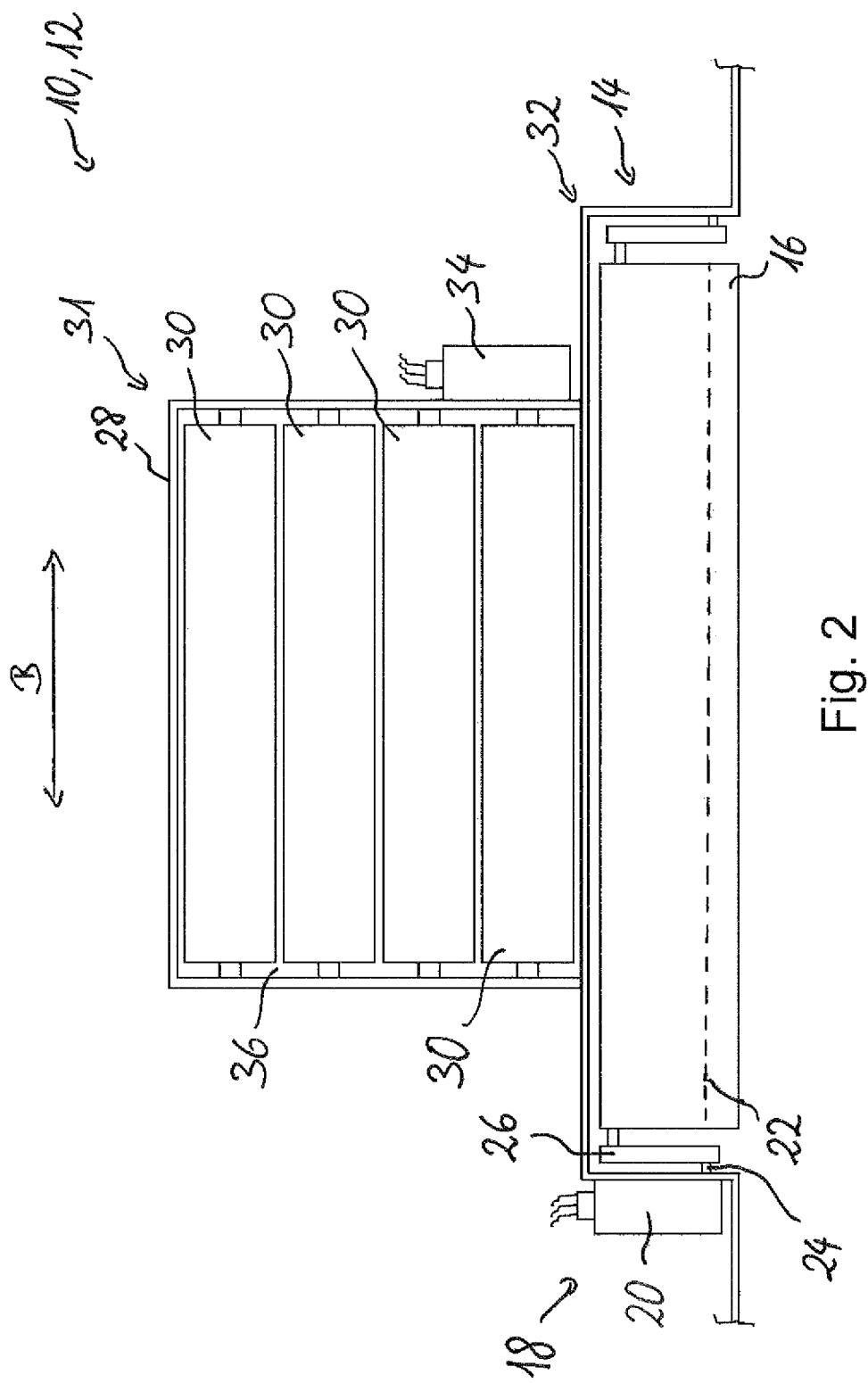

FIGS. 1 and 2 show a front area 10 of a vehicle 12. The vehicle 12 comprises a front spoiler 14 in its front area 10 with a spoiler lip 16 and a spoiler lip drive 18. The spoiler lip 16 is displaceable by the spoiler lip drive 18 such that by its displacement the aerodynamic properties of the vehicle 12 are changeable in the front area 10. The spoiler lip drive 18 is electro-mechanical and, as shown in the figures, can include an electric rotary motor 20 as the power source.

By means of the spoiler lip drive 18 the spoiler lip 16 can be displaced between the two positions shown in FIGS. 1 and 2. FIG. 1 shows a retracted position of the spoiler lip 16 in which the latter is held at low speeds of around 70 km/h or less. Such speeds typically are seen during drives through closed municipalities. At these speeds the aerodynamic properties of the front area 10 of the vehicle 12 have no essential influence on the driving behavior of the vehicle 12. In this retracted position, however, the interacting area of the spoiler lip 16 with possible obstacles is reduced compared to the extended position shown in FIG. 2, so that as a result the danger of damage in comparison with the extended position is reduced.

The spoiler lip 16 is displaced into the extended position shown in FIG. 2 at higher speeds, such as those outside of closed municipalities. Lift acting on the front area 10 of the vehicle 12 is hereby reduced compared to an identical vehicle under identical driving conditions, but with a retracted spoiler lip or no spoiler lip, whereby the traction control of the front wheels and thereby the driving safety is increased.

In the swivel drive 18 shown in the figures, the spoiler lip 16 is swiveled about an axis 22 which does not run through the center of mass of the spoiler lip 16, so that as the result of a swivel movement its center of gravity is displaced. It is here possible to move the spoiler lip 16 to a greater extent than for a swivel drive in which the center of gravity of the spoiler lip does not change as the result of a swivel movement, such as when the spoiler lip is swiveled about an axis by the center of mass. Thus in the design shown in the figures the aerodynamic properties of the front area 10 of the vehicle 12 can be influenced to a greater extent in comparison with a previously described swivel drive in which the center of gravity is not displaced by the swivel movement.

The shaft 24 of the motor 20 shown in the figures could, in principle, be in a direct torque transmission connection with the spoiler lip 16. A comparatively higher flexibility with respect to the installation location of the motor 20 can hereby be achieved such that as shown in the figures it has a torque transmission connection with the at least one spoiler lip 16 and an interposed linkage and/or a gear box 26. Also conceivable in this regard is the use of a reduction or translating gear, in order to be able to effect a defined displacement of the spoiler lip 16.

The front spoiler 14 can at least be partially received in a position in a functional unit already present in the front area 10 of the vehicle 12, which then contributes to a compact configuration. Conceivable hereby is a recess of the spoiler lip 16 in a bumper component and/or a motor shield and/or an air valve device housing.

In the embodiment shown in the figures the spoiler lip 16 is received in an air valve device housing 28. This configuration is especially advantageous, since an air valve device housing 28 is itself already made available as a housing which is provided to receive valves 30 of an air valve device 31 extending in a vehicle width direction B, so that the integration of a spoiler lip 16 extending fundamentally in a vehicle width direction B is especially easy. The air valve device housing 28, as shown in the figures, can have a spoiler receptacle section 32 in which the spoiler lip 16 is received.

A plurality of air valves 30 is provided in the air valve device housing 28 which can be adjustably received on the air valve device housing 28 by means of an air valve drive 34 such that by a displacement of at least one air valve 30, the effective flow cross-section of a flow-through opening 36 defined inside the air valve device housing 28 can be changed. Thought could be given here to using the air valve drive 34 also as the spoiler lip drive. In order to be able to displace the spoiler lip 16 and the air valves 30 independently of each other at any time, it is preferable if the spoiler lip drive 18, as in the embodiment shown in the figures, is separate from the drive of the air valve device 34.

In order to efficiently influence the aerodynamic properties of the vehicle 12, it is preferred that the at least one spoiler lip 16 have as large an area as possible. In order not to severely limit the ground clearance because of the front spoiler 14, a spoiler lip 16 can be made available with a large area, such that the spoiler lip 16 extends across at least 80% of the wheel track of the front axle of the vehicle 12. The influence of the front spoiler 14 on the aerodynamic properties of the vehicle 12 can accordingly be increased if the spoiler lip 16 extends across at least 90% or even across the entire wheel track of the front axle of the vehicle 12.

In principle, thought can be given to constructing the front spoiler in several pieces from front spoiler sections, wherein the individual front spoiler sections can then be positioned in succession, for example in the vehicle width direction B.

The individual front spoiler sections can then in turn be displaced by the respective spoiler lip drives. Such a design, however, is very complicated and of a high weight because of the plurality of drives. Therefore the design shown in the figures is advantageous in that the front spoiler 14 comprises a single spoiler lip 16. Such a low weight can hereby be provided in that the spoiler lip 16 is adjustable by a single spoiler lip drive 18, for example a single electromotor 20.

A low weight and a high mechanical stability can also be guaranteed when the spoiler lip 16 is constructed in sections, at least in part but preferably completely, from a thermoplastically bonded fiber structure.

In this design the at least one spoiler lip is constructed at least in sections from a fiber structure which is bound with a thermoplastic bonding agent. With respect to the choice both of the thermoplastic binding agent as well as the fibers of the fiber structure there are basically no limitations, so long as the melting or softening point and the destruction point of the fibers are higher than the melting or softening point of the thermoplastic binding agent. The fibers could be glass, carbon, aramid or natural fibers which can be bonded with all thermoplastic synthetic materials, like PP, PE, PET, TPU or TPE. As an alternative the spoiler lip can be produced from these synthetic materials without a filling.

In addition a spoiler lip 16 formed from a thermoplastically bonded fiber structure can be constructed as a porous component part which because of its porosity, can on the one hand be low-weight and on the other hand can also have also acoustic dampening properties.

Thought can also be given to covering the spoiler lip 16, at least in part but preferably completely, with a protective film such as metal, which prevents in particular the penetration of water into the porous structure. In order to thereby not, or only minimally, influence the acoustic properties of the spoiler lip 16, the protective film can be perforated in particular with micro-perforations. Perforation is understood to mean that through holes or slits are provided in the protective film. In such a micro-perforation the hole diameters or the slit widths amount to less than 1 mm, preferably less than 500 µm. Both the hole diameter as well as the slit width or the hole and slit separations can be selected depending on the expected acoustic frequencies, in order to be able to guarantee an optimal sound passage.

The invention claimed is:

1. A vehicle comprising:
a front spoiler with at least one spoiler lip provided in a front area of the vehicle and a spoiler lip drive by means of which the at least one spoiler lip can be displaced such that by means of a displacement of the at least one spoiler lip the aerodynamic properties of the vehicle can be changed in the front area,
wherein the spoiler lip drive of the at least one spoiler lip is electro-mechanical, and,
wherein the front spoiler is received in an air valve device housing at least partially, wherein the spoiler lip drive of the at least one spoiler lip is provided separately from a drive of an air valve device received in the air valve device housing.

2. The vehicle according to claim 1,
wherein the spoiler lip drive of the at least one spoiler lip is a swivel drive which is installed to swivel the at least one spoiler lip such that the aerodynamic properties of the vehicle can be changed by swiveling of the at least one spoiler lip, wherein the at least one spoiler lip can swivel about an axis which does not run though the center of mass of the spoiler lip.

3. The vehicle according to claim 2,
wherein the swivel drive has a torque transmission connection with the at least one spoiler lip with an interposed linkage and/or a gear box.

4. The vehicle according to claim 1,
wherein at least a part of the front spoiler is or can be received in a front component part of the vehicle.

5. The vehicle according to claim 4,
wherein the front component part of the vehicle consists one of a bumper, an engine shield and an air valve housing.

6. The vehicle according to claim 1,
wherein the front spoiler comprises one single spoiler lip which can be displaced by one single spoiler lip drive.

7. The vehicle according to claim 1,
wherein the at least one spoiler lip is constructed at least in sections out of a thermoplastically bonded fiber structure.

8. The vehicle according to claim 1, wherein the at least one spoiler lip can swivel about a plurality of axes, by means of a four-bar linkage.

9. The vehicle according to claim 1, wherein the at least one spoiler lip is or can be received in a front component part of the vehicle.

10. The vehicle according to claim 9, wherein the front component part of the vehicle consists one of a bumper, an engine shield and an air valve housing.

11. The vehicle according to claim 1, wherein the at least one spoiler lip and the spoiler lip drive is or can be received in a front component part of the vehicle.

12. The vehicle according to claim 1, wherein the front spoiler is received in an air valve device housing completely, wherein the spoiler lip drive of the at least one spoiler lip is provided separately from a drive of an air valve device received in the air valve device housing.

13. The vehicle according to claim 1, wherein the at least one spoiler lip is constructed completely out of a thermoplastically bonded fiber structure.

14. The vehicle according to claim 1, wherein the front component part of the vehicle consists one of a bumper, an engine shield and an air valve housing.

* * * * *